2,879,198
Patented Mar. 24, 1959

2,879,198

TRICHLOROMETHYL BENZENETHIO-SULFONATES

Elizabeth M. Hardy and John F. Hosler, Bound Brook, N.J., and Glentworth Lamb, Stamford, Conn., assignors to American Cyanamid Company, New York, N.Y., a corporation of Maine No Drawing. Application May 17, 1957
Serial No. 659,764

4 Claims. (Cl. 167—30)

The present invention relates to new and useful trichloromethyl benzenethiosulfonate compounds and to fungicidal compositions containing the same.

The novel products of this invention are the trichloromethyl 4-(2-carboxyvinyl)benzenethiosulfonate and trichloromethyl 4-(2-carbamoylvinyl)benzenethiosulfonate compounds which conform to the formula

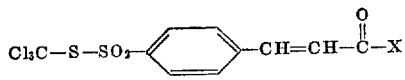

wherein X stands for —NH$_2$ or —OH, and salts of the trichloromethyl 4-(2-carboxyvinyl)benzenethiosulfonate.

These products are especially valuable since they have high fungicidal activity coupled with substantially no phytotoxicity when applied to the foliage of plants. This is in marked contrast to such known thiosulfonates as trichloromethyl benzenethiosulfonate and trichloromethyl p-toluenethiosulfonate which show strong phytotoxicity, leading particularly to damage to foliage.

The trichloromethyl benzenethiosulfonate compounds are readily prepared by reacting an alkali metal salt of the corresponding sulfinic acid with perchloromethylmercaptan in an aqueous medium at a temperature within the range of from about 10° C. to about 50° C. The reaction may be illustrated by the following equation, using the sodium salt as an example:

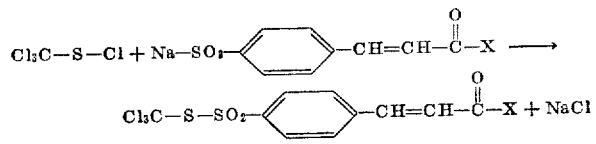

Sulfinic acids employed in the preparation of the above compounds may be synthesized by several well-known methods. Among these may be mentioned the reduction of sulfonyl halides with metals such as iron and zinc or with sulfides or sulfites.

Typical salts of the trichloromethyl 4-(2-carboxyvinyl)-benzenethiosulfonate compound include the alkali metal salts such as those of sodium, potassium and lithium, the alkaline earth metal salts such as those of calcium, strontium and barium, the ammonium salt, and salts of organic bases such as those of dimethylamine, trimethylamine, diethylamine, triethylamine, isopropylamine, dipropylamine, dibutylamine, hexylamine, dihexylamine, 2-ethylhexylamine, dioctylamine, dodecylamine, dioctadecylamine, diallylamine, triallylamine, dicyclohexylamine, benzylamine, dibenzylamine, diphenylguanidine, aminopyridine, piperazine, pyrrolidine, piperidine and morpholine.

The invention will be more particularly illustrated by the following examples in which all parts are by weight unless otherwise indicated.

EXAMPLE 1

Fifty-seven parts of cinnamamide are added during a period of thirty minutes with good stirring to 154 parts (by volume) of chlorosulfonic acid. The temperature of the mixture is held at about 30° C. by a cooling bath during the addition of the cinnamamide. The dark brown solution is stirred for ½ hour at room temperature, and then added to about 1500 parts of crushed ice. The resulting white precipitate of 4-(2-carbamoylvinyl)benzenesulfonyl chloride is filtered, washed with cold water and dried at room temperature. Sixty-five parts of the 4-(2-carbamoylvinyl)benzenesulfonyl chloride are added during a period of thirty minutes with good stirring to a solution of 101 parts of sodium sulfite (Na$_2$SO$_3$.7H$_2$O) in 400 parts of water held at about 20° C. The pH of the mixture is maintained at approximately 7 by the addition of concentrated sodium hydroxide solution. After stirring for one hour, the mixture is filtered, and to the filtrate there is added 37.2 parts of perchloromethylmercaptan at a temperature of 12–15° C. The reaction mixture is stirred for another hour, and the precipitated trichloromethyl 4-(2-carbamoylvinyl)benzenethiosulfonate is filtered off, washed with water and then with hexane. After recrystallization from ethylene chloride, the product melts at 174–175° C. with decomposition.

EXAMPLE 2

One hundred eighteen parts of cinnamic acid are added gradually to 450 parts (by volume) of chlorosulfonic acid, with stirring, at a temperature of 10–15° C., after which the mixture is heated to about 60° C. and maintained at that temperature for 1½ hours. After standing at room temperature for 16 hours, the reaction mixture is poured onto crushed ice, and the precipitated 4-(2-carboxyvinyl)benzenesulfonyl chloride is filtered off and washed with ice water. One hundred ninety parts of the 4-(2-carboxyvinyl)benzenesulfonyl chloride are slurried in 500 parts of ice water, and to the slurry there is added a solution of 150 parts of Na$_2$SO$_3$ in 450 parts of water, with stirring, at a temperature of about 15° C. Caustic soda solution (50% by wt. NaOH) is gradually added to maintain a slightly alkaline reaction medium. After stirring overnight at room temperature, the mixture is filtered and to the filtrate there is added 148 parts of perchloromethylmercaptan over a period of ½ hour at a temperature of 10–15° C. The resulting slurry is stirred for an additional ½ hour, and the precipitated trichloromethyl 4-(2-carboxyvinyl)benzenethiosulfonate is filtered off, washed with ice water and then with hexane. The white crystalline product melts at 193–195° C. with decomposition.

EXAMPLE 3

A slurry of 36 parts of trichloromethyl 4-(2-carboxyvinyl))benzenethiosulfonate in 100 parts of water is neutralized with 4 parts of sodium hydroxide, dissolved in 20 parts of water. The resulting solution is evaporated to dryness under vacuum to yield the sodium salt of trichloromethyl 4-(2-carboxyvinyl)benzenethiosulfonate.

EXAMPLE 4

A slurry of 36 parts of trichloromethyl 4-(2-carboxyvinyl)benzenethiosulfonate in 100 parts of water is neutralized with 5.6 parts of potassium hydroxide dissolved in 20 parts of water. The resulting solution is evaporated to dryness under vacuum to yield the potassium salt of trichloromethyl 4-(2-carboxylvinyl)benzenethiosulfonate.

EXAMPLE 5

A slurry of 36 parts of trichloromethyl 4-(2-carboxyvinyl)benzenethiosulfonate in 100 parts of water is mixed with a slurry of 3.7 parts of calcium hydroxide in 50 parts of water. After strring at 50° C. for a period of one hour, the mixture is evaporated to dryness under vacuum to yield the calcium salt of trichloromethyl 4-(2-carboxyvinyl)benzenethiosulfonate.

EXAMPLE 6

A slurry of 36 parts of trichloromethyl 4-(2-carboxyvinyl)benzenethiosulfonate in 100 parts of water is mixed with a slurry of 8.5 parts of barium hydroxide in 50 parts of water. After stirring at 50° C. for a period of one hour, the mixture is evaporated to dryness under vacuum to yield the barium salt of trichloromethyl 4-(2-carboxyvinyl)benzenethiosulfonate.

EXAMPLE 7

A slurry of 36 parts of trichloromethyl 4-(2-carboxyvinyl)benzenethiosulfonate in 100 parts of water is treated with 25 parts of 14.8 normal ammonium hydroxide. The resulting solution is evaporated to dryness under vacuum to yield the ammonium salt of trichloromethyl 4-(2-carboxyvinyl)benzenethiosulfonate.

EXAMPLE 8

A solution of 36 parts of trichloromethyl 4-(2-carboxyvinyl)benzenethiosulfonate in 100 parts of acetone is treated with a solution of 20 parts of diphenylguanidine in 100 parts of acetone. On evaporation of the acetone, the diphenylguanidine salt of trichloromethyl 4-(2-carboxyvinyl)benzenethiosulfonate is obtained as a viscous yellow oil.

EXAMPLE 9

A slurry of 36 parts of trichloromethyl 4-(2-carboxyvinyl)benzenethiosulfonate in 100 parts of water is treated with 30 parts of 25% aqueous dimethylamine. The resulting solution is evaporated to dryness under vacuum to yield the dimethylamine salt of trichloromethyl 4-(2-carboxyvinyl)benzenethiosulfonate.

EXAMPLE 10

A slurry of 36 parts of trichloromethyl 4-(2-carboxyvinyl)benzenethiosulfonate in 100 parts of water is treated with 8.7 parts of morpholine. The resulting solution is evaporated to yield the morpholine salt of trichloromethyl 4-(2-carboxyvinyl)benzenethiosulfonate.

The compounds of this invention are effective in inhibiting the growth of various fungi and therefore are valuable fungicides, particularly in the agricultural and textile fields. Thus, for example, aqueous dispersions of the compounds give a 100% kill of the spores of *Sclerotinia fructigena* and *Macrosporium sarcinaeforme* at a concentration of 0.001%. Further, these compounds are particularly effective in eradicating such organisms as the anthracnose fungus, *Colletotrichium gossypii*, on cotton seed, the fungus, *Diplodia zeae*, on corn seed, and the scab fungus, *Venturia inaequalis*, on the foliage of apple trees.

Although the above compounds may be used alone in the control of fungi, it is usually preferable to mix them with inert carriers. For dusting purposes the carrier may include materials such as talc, fuller's earth, bentonite, pumice, silica, silicates, chalk and the like. Under some circumstances, it may be desirable and feasible to apply the present compounds in the form of an emulsion or suspension in a liquid. Such compositions may in addition contain various wetting and/or spreading agents and may be formulated in accordance with procedures well-known in the art. Examples of suitable dispersing or wetting agents include the fatty acid esters of polyhydric alcohols (for example, Span), the sodium salt of a polymerized propyl naphthalene sulfonic acid (Daxad 11) and formed by condensing formaldehyde with propyl naphthalene sodium sulfonate, the alkylarylpolyether alcohols (such as Triton X–100), the ethylene oxide addition products of such esters as, for example "Tween" and the like.

The proportion of the active ingredient to the inert material in the prepared composition may be varied in accordance with the particular effects desired and the conditions under which it is to be used. In general, it has been found that concentrations of the active ingredient ranging from about 0.1% to 50% of the weight of the inert carrier are useful, although for most purposes an amount ranging from 0.5% to 5% is preferred.

EXAMPLE 11

Pea seeds (variety Perfection) were treated with various amounts of dusts consisting of two parts of attapulgite clay and one part of the thiosulfonate compound. The treated seeds were planted in soil heavily infested with fungi in a greenhouse maintained at approximately 65° F., using duplicate flats of 50 seeds each. Table I gives the percent emergence or stand of seedlings from each treatment, counts being made 14 days after planting.

*Table I*

| Compound | Grams of compound per Kilogram of seed | Percent stand of seedlings |
|---|---|---|
| None (untreated seed) | 0 | 5 |
| Trichloromethyl 4-(2-carboxyvinyl)-benzenethiosulfonate | 2 | 98 |
| Do | 1 | 96 |
| Trichloromethyl 4-(2-carbamoylvinyl)-benzenethiosulfonate | 2 | 68 |
| Do | 1 | 54 |

EXAMPLE 12

The foliage of young apple trees (variety Rome Beauty, 3–4 feet height) was inoculated with a spore suspension in water of the scab organism, *Venturia inaequalis*. The inoculated trees were placed in a humidity cabinet at 23–25° C. to allow the infection to develop. After 18, 24 and 30 hour periods, test trees were removed from the cabinet and sprayed with a dispersion containing a rate equivalent to one pound of trichloromethyl 4-(2-carboxyvinyl)benzenethiosulfonate in 100 gallons of carrier (65% acetone-35% water by volume). The sprayed trees were replaced in the humidity cabinet for a period of ten days. An inspection of the foliage showed that the scab organism was eradicated as well at 30 hours after infection as it was at 18 hours. There were no indications of phytotoxicity to foliage of the sprayed trees.

EXAMPLE 13

Cotton seeds infected with the anthracnose fungus were treated with various amounts of a dust consisting of 8.3 parts of trichloromethyl 4-(2-carboxyvinyl)benzenethiosulfonate, 16.5 parts of attapulgite clay and 75.2 parts of talc. The treated seeds were planted in three replicates of 32, and then placed in a constant temperature cabinet at 23–25° C. for germination. At the end of a 14-day period, the data in Table 2 was recorded on a 96 seed basis.

*Table 2*

| Compound | Grams of compound per Kilogram of seed | Total emerged seedlings | Healthy seedlings | Anthracnose lesions |
|---|---|---|---|---|
| None (untreated seed) | 0.00 | 87 | 3 | 84 |
| Trichloromethyl 4-(2-carboxyvinyl)benzenethiosulfonate | 1.66 | 87 | 73 | 3 |
| Do | 0.40 | 85 | 70 | 10 |

EXAMPLE 14

Phytotoxicity tests were carried out by spraying lima bean and nasturtium plants to run off with a dispersion containing a rate equivalent to two pounds of the thiosulfonate compound in 100 gallons of carrier (50% acetone-50% water by volume). An inspection of the sprayed plants after a period of 5 days showed no injury to the foliage from sprays containing the trichloromethyl 4-(2- carboxyvinyl)benzenethiosulfonate and trichloromethyl 4-(2-carbamoylvinyl)benzenethiosulfonate compounds, whereas severe burning and chlorosis of leaves occurred on both groups of plants sprayed to run off with a dispersion containing a rate equivalent to two pounds of the known trichloromethyl p-toluenethiosulfonate compound in 100 gallons of the acetone-water carrier.

We claim:

1. A compound from the group consisting of trichloromethyl 4-(2-carboxyvinyl)benzenethiosulfonate, trichloromethyl 4-(2-carbamoylvinyl)benzenethiosulfonate and the alkali metal, alkaline earth metal, ammonium and amine organic base salts of trichloromethyl 4-(2-carboxyvinyl)benzenethiosulfonate.

2. Trichloromethyl 4-(2-carboxyvinyl)benzenethiosulfonate.

3. Trichloromethyl 4-(2-carbamoylvinyl)benzenethiosulfonate.

4. A fungicidal composition containing as the active ingredient a compound from the group consisting of trichloromethyl 4 - (2 - carboxyvinyl)benzenethiosulfonate, trichloromethyl 4 - (2 - carbamoylvinyl)benzothiosulfonate and the alkali metal, alkaline earth metal, ammonium and amine organic base salts of trichloromethyl 4-(2-carboxyvinyl)benzenethiosulfonate, and an inert carrier therefor.

No references cited.